United States Patent [19]

Herriau

[11] 4,387,656
[45] Jun. 14, 1983

[54] PRECISION SOWING SEED DRILL

[75] Inventor: Paul Herriau, Cambrai, France

[73] Assignee: Societe Sogefina, Societe de Gestion Financiere Armoricaine, Paris, France

[21] Appl. No.: 249,363

[22] Filed: Mar. 31, 1981

[30] Foreign Application Priority Data

Mar. 31, 1980 [FR] France .............................. 80 07189

[51] Int. Cl.³ .............................................. A01C 5/00
[52] U.S. Cl. .................................................... 111/86
[58] Field of Search ...................... 111/77, 34, 85, 86, 111/83, 87

[56] References Cited

U.S. PATENT DOCUMENTS

| 1,957,738 | 5/1934 | Strandlund | 111/83 |
| 2,545,747 | 3/1951 | Oswald et al. | 111/85 |
| 3,336,885 | 8/1967 | Lebow | 111/85 |

FOREIGN PATENT DOCUMENTS

| 973007 | 8/1975 | Canada | 111/85 |
| 169213 | 5/1905 | Fed. Rep. of Germany . | |
| 169213 | 3/1906 | Fed. Rep. of Germany | 111/87 |
| 1229027 | 3/1960 | France . | |
| 2214226 | 8/1974 | France . | |
| 490423 | 2/1976 | U.S.S.R. | 111/86 |
| 528052 | 10/1976 | U.S.S.R. | 111/86 |
| 609501 | 5/1978 | U.S.S.R. | 111/34 |

Primary Examiner—James R. Feyrer
Attorney, Agent, or Firm—Young & Thompson

[57] ABSTRACT

The present invention concerns a process and apparatus for sowing seeds in so-called precision sowing and a distributor for practicing such a process. The distributors comprise, for each furrow, a ploughshare 4 opening the furrow, a pneumatic transport channel 6 for seeds abutting opposite the furrow 8 and a setting wheel 1 sinking the seeds distributed in the furrow. The seed is, at the outlet of the pneumatic transport channel of the distributor, projected toward the apex D of the dihedral formed by the forward peripheral surface of the setting wheel and the bottom of the furrow.

4 Claims, 5 Drawing Figures

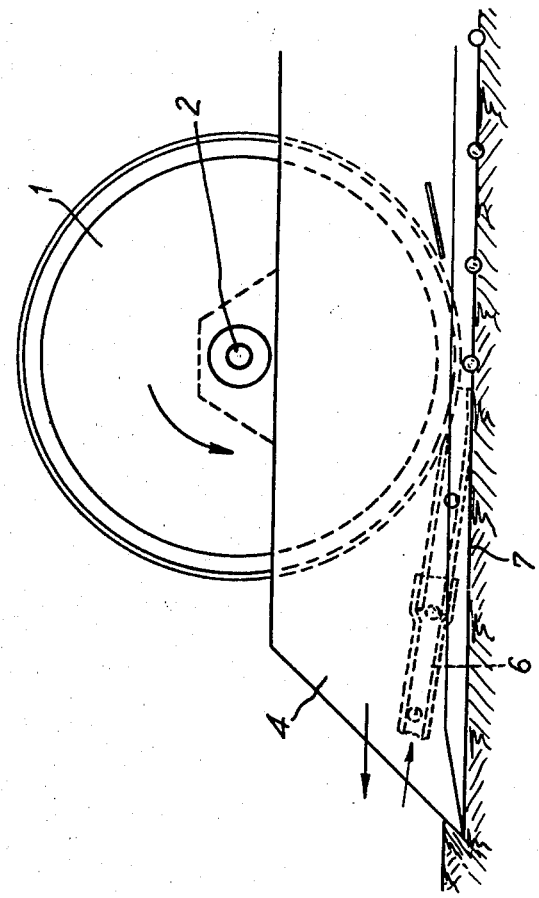
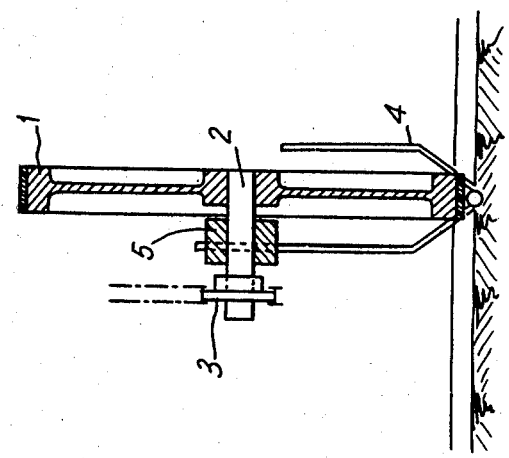

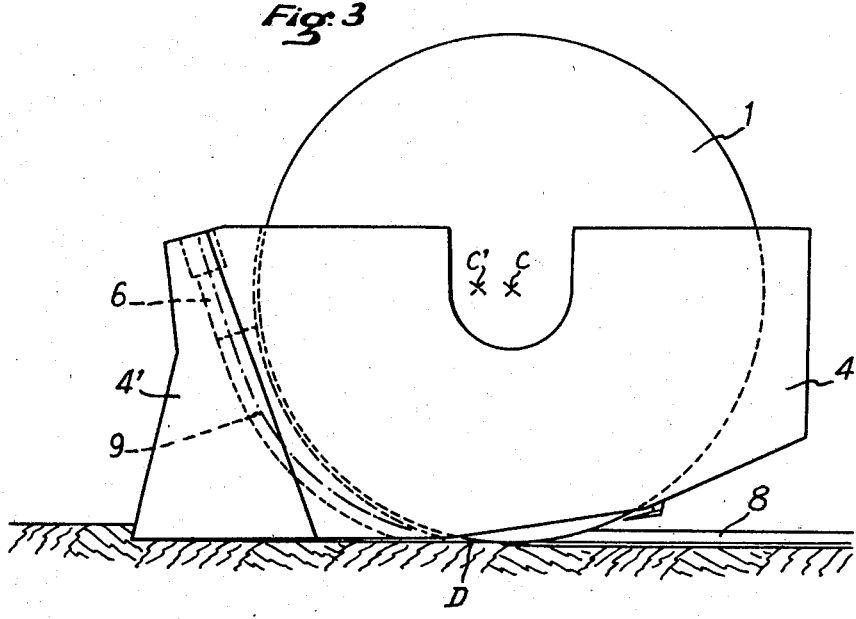
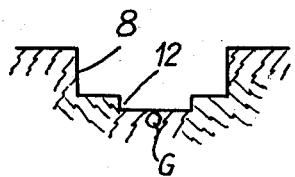
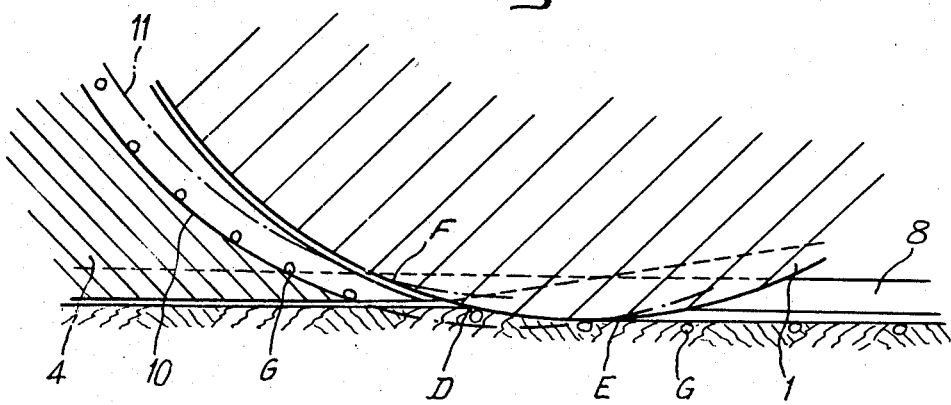

PRECISION SOWING SEED DRILL

The present invention relates to a process for planting seeds adapted principally for so-called precision sowing in the course of which one must ensure a precise placement of the seed in the furrow.

At present, in most of the single-seed sowers utilized for precision sowing, either the seed falls by gravity into the furrow at the outlet of the distribution device, or the grain is carried by a fluid current in a tube to the level of and behind the ploughshare which forms the furrow. In all cases, but particularly in the case of pneumatic conveyance, the seed arrives in the furrow at a substantial speed. There is thus the risk that the seed will rebound and roll, which, despite the fact that the distributors of the precision sowers ensure a fairly constant spacing between the grains distributed at the outlet of the sower, results in a substantial displacement of the seeds to one side or the other of the axis of the furrow and variations in their spacing.

Now to obtain high production and to facilitate the subsequent cultivation operations, it is necessary that the seeds such as those of beet root, corn or the like should be distributed along a straight line and with regular spacing.

The present invention therefore has for its object to remedy the above disadvantages by providing a process for sowing seeds, used principally in precision sowing, which permits avoiding dispersion of the seeds from the theoretical sowing point.

Another object of the invention is the provision of a process for sowing seeds in so-called precision sowing carried out by distributors comprising for each furrow a ploughshare that opens a flat-bottomed furrow, a passageway for pneumatic transport of the seeds ending in the furrow and a setting wheel sinking the seeds distributed in the bottom of the furrow, characterized in that the seed is, at the outlet of the pneumatic transport channel of the distributor, projected toward the apex of the dihedral formed between the lower forward peripheral surface of the setting wheel and the bottom of the furrow. In the process according to the invention, the seed does not bounce on the ground but is seized in the dihedral between the setting wheel and the soil at the bottom of the furrow and immediately sunk in the soil by the setting wheel.

The present invention also has for its object the provision of a distributor of the type comprising for each furrow a ploughshare for opening the furrow, a pneumatic transport channel for seeds ending in the furrow and a setting wheel sinking the seeds distributed in the furrow, characterized in that the axis of the end of the pneumatic transport channel for the seeds ending in the furrow is directed toward a point on the periphery of the setting wheel situated immediately adjacent its lower edge.

Preferably the seed is guided by the pneumatic transport channel into immediate proximity with the apex of the dihedral, the transport channel being in prolongation thereof to adjacent the bottom of the furrow. According to a preferred embodiment, the end of the transport channel encloses the lower forward portion of the periphery of the setting wheel, the portion of the end of the transport channel having a circular arcuate cross section and the forward generatrix of this channel being eccentric with regard to the setting wheel of which it intersects the periphery adjacent the apex of the dihedral.

In this preferred embodiment, the seed, by virtue of its velocity, is laid against the bottom of the channel and its trajectory is merged with the forward generatrix, which avoids deflections which could result from the variation in position of the trajectory of the seed in the section of the transport channel.

According to another characteristic of the present invention and to avoid the seed being displaced in the soil at the moment it is sunk by the setting wheel by virtue of the speed of sliding of the latter, the setting wheel is driven in such a manner that its peripheral velocity will be substantially equal to the speed of advance of the distributor. Preferably the peripheral speed is greater by 1 to 2% than the speed of advance of the distributor.

Other characteristics and advantages of the present invention will become apparent from a reading of the description of one example of embodiment of the process according to the invention and of a preferred embodiment of the distributor, given hereinafter with reference to the accompanying drawings in which:

FIG. 1 is a schematic side elevational view of an apparatus for bringing the seed under a setting wheel according to the process of the present invention;

FIG. 2 is an axial sectional view of FIG. 1;

FIG. 3 is a side elevational view of a setting element of a distributor;

FIG. 4 is a detail view on a larger scale of the seed setting region of the apparatus of FIG. 3, and FIG. 5 is a detailed sectional view of the furrow after the setting wheel has passed.

Referring to the drawings, the reference 1 designates the setting wheel. Setting wheel 1 is mounted for rotation on an axle 2 which is rotatably driven by a transmission device of any known type such as a chain and gear system 3 from one of the distributor support or ground-engaging wheels or the tractor output, such that the peripheral speed of the setting wheel will be equal to the speed of advance of the distributor. A ploughshare 4 for forming the furrow is positioned in front of the setting wheel 1 and is fixed on the bearing 5 carrying axle 2 of the setting wheel. According to the present invention, the axis of the outlet end of the tube 6 for feeding seeds to the furrow, of the distribution device of the distributor is substantially tangent to the setting wheel and directed toward the apex of the dihedral formed between the periphery of the setting wheel and the bottom 7 of the furrow. Thanks to this, the seed will not bounce on the ground and it is directly sunk in the bottom of the furrow. There accordingly results at the level of the soil the same regularity of distribution of the seeds particularly as to their spacing, as that ensured by the distributing device of the distributor.

In the embodiment of FIGS. 3 and 4, FIG. 4 being a detailed cross-sectional view on the central plane of the setting wheel 1, the same elements are designated by the same reference numerals. Ploughshare 4 is constituted by a plate in which is cut a longitudinal recess for the setting wheel 1, the forward portion 4' having an oblique face so as to dig a furrow 8 of rectangular cross section. The tube 6 terminates obliquely in the upper forward portion of the ploughshare and is prolonged by a throat 9 with a torical bottom whose center at C' is in front of the center C of the setting wheel, this throat joining with the tube 6 through a straight portion. The summit of the dihedral between the bottom of the furrow 6 and the peripheral surface of the wheel 1 is indicated by reference D. The generatrix 10 at the bottom of throat 9 intersects the peripheral circle of the setting wheel 1 at E to the rear of but immediately adjacent point D, while the directrix circle 11 of the throat intersects it at F higher than point D. With this arrangement, the seeds G, which, under the influence of centrifugal force and of gravity, traverse the end of the guide passage the length of the generatrix 10, are projected toward point D and grasped between the bottom of the furrow 8 and the setting wheel which sinks them at the same time that it tamps the bottom of the furrow at 12.

The embodiment of the process described above is susceptible of numerous modifications without departing from the scope of the annexed claims.

What is claimed is:

1. A seed distributor of the type comprising for each furrow a ploughshare for opening the furrow, a pneumatic transport channel for seeds ending in the furrow, and a setting wheel sinking the seeds distributed in the furrow, the terminal part of the pneumatic transport channel being directed toward the apex of the dihedral formed by the lower forward peripheral surface of the setting wheel with the bottom of the furrow and terminating within the furrow adjacent the bottom of the furrow and directly beneath a portion of the periphery of the setting wheel that is within the furrow, whereby when seeds are released under the action of air pressure from the pneumatic transport channel they are immediately captured in the nip formed by the setting wheel periphery and the bottom of the furrow to be depressed into the bottom of the furrow in spaced relation.

2. A distributor according to claim 1, in which the end of the transport channel peripherally surrounds the lower forward portion of the periphery of the setting wheel; the end portion of the transport channel having the shape of an arc of a circle and the forward generatrix of this channel being eccentric relative to the setting wheel whose periphery it intersects adjacent the apex of the dihedral.

3. A distributor according to claim 2, in which the rear part of the ploughshare surrounds the lower forward portion of the periphery of the setting wheel, the end part of the transport channel opening in said rear part of the ploughshare which surrounds said lower forward portion of the periphery of the setting wheel, said opening ending adjacent the apex of the dihedral formed by the lower part of the ploughshare and the periphery of the setting wheel.

4. A distributor according to claim 2, the center of said forward generatrix being disposed in advance of the center of the setting wheel, said generatrix intersecting the periphery of the setting wheel adjacent and to the rear of said apex of the dihedral.

* * * * *